(12) United States Patent
Peterkin

(10) Patent No.: US 12,552,591 B2
(45) Date of Patent: *Feb. 17, 2026

(54) TRANSPORTABLE SELF-CONTAINED CUTTING BOX

(71) Applicant: Ryan Peterkin, Nikiski, AK (US)

(72) Inventor: Ryan Peterkin, Nikiski, AK (US)

(*) Notice: Subject to any disclaimer, the term of this patent is extended or adjusted under 35 U.S.C. 154(b) by 0 days.

This patent is subject to a terminal disclaimer.

(21) Appl. No.: 18/434,574

(22) Filed: Feb. 6, 2024

(65) Prior Publication Data

US 2024/0174424 A1    May 30, 2024

Related U.S. Application Data

(63) Continuation of application No. 17/396,403, filed on Aug. 6, 2021, now Pat. No. 12,077,362.

(51) Int. Cl.
| | | |
|---|---|---|
| *B65D 81/20* | (2006.01) | |
| *B60P 3/22* | (2006.01) | |
| *B65D 88/74* | (2006.01) | |

(52) U.S. Cl.
CPC ........ *B65D 81/2015* (2013.01); *B60P 3/2205* (2013.01); *B60P 3/226* (2013.01); *B65D 88/744* (2013.01); *B65D 88/748* (2013.01)

(58) Field of Classification Search
CPC ...... B60P 3/226; B65D 88/744; B65D 88/748
See application file for complete search history.

(56) References Cited

U.S. PATENT DOCUMENTS

| | | | |
|---|---|---|---|
| 1,381,669 A | 6/1921 | Schreiber | |
| 1,394,692 A | 10/1921 | Stocker | |
| 1,562,991 A | 11/1925 | Rudigier | |
| 1,866,544 A | 7/1932 | Cleaver | |
| 1,914,585 A | 6/1933 | Smith | |
| 2,145,614 A | 1/1939 | Stambaugh | |
| 2,558,648 A | 6/1951 | Gausmann | |

(Continued)

FOREIGN PATENT DOCUMENTS

| | | |
|---|---|---|
| CA | 3095009 A1 | 4/2022 |
| CN | 201980127 U | 9/2011 |

(Continued)

OTHER PUBLICATIONS

Https://en.wikipedia.org/wiki/Vacuum_truck; Wikipedia Webpage Article "Vacuum Truck"; Last Edited Mar. 23, 2021; Received Aug. 2, 2021.

(Continued)

*Primary Examiner* — Anthony D Stashick
*Assistant Examiner* — Raven Collins
(74) *Attorney, Agent, or Firm* — Fargo Patent & Business Law; Thomas Kading

(57) ABSTRACT

A heated portable vacuum slurry box for efficiently storing and transporting material including drill cuttings from gas and oil well sites. The slurry box generally includes a vacuum tank, a structure attached to the tank, a mechanical bay, a vertical tailgate, and a hook for pulling the slurry box onto a vehicle. The features allow for the slurry box to be meet space restriction requirements at a well site while as well as function within the environmental conditions of winter and summer seasons. Jacketed openings, stack mount systems, and a removable power unit allow for efficient use of the slurry box.

18 Claims, 11 Drawing Sheets

(56) References Cited

U.S. PATENT DOCUMENTS

| | | | |
|---|---|---|---|
| 2,624,553 | A | 1/1953 | Thompson |
| 2,696,086 | A | 12/1954 | Jones |
| 3,228,466 | A | 1/1966 | Carleton |
| 3,255,517 | A | 6/1966 | La Barbera |
| 3,359,971 | A | 12/1967 | Snelling |
| 3,595,307 | A | 7/1971 | Mowalt-Larssen |
| 3,638,443 | A | 2/1972 | Maurer |
| 3,685,458 | A | 8/1972 | Price |
| 3,969,138 | A | 7/1976 | Werth |
| 4,136,463 | A | 1/1979 | Nolan |
| 4,155,586 | A | 5/1979 | Flynn |
| 4,414,462 | A | 11/1983 | Price |
| 4,476,788 | A | 10/1984 | Loevinger |
| 4,502,392 | A | 3/1985 | Rosenberger |
| 4,515,189 | A | 5/1985 | Mowatt-Larssen |
| 4,530,288 | A | 7/1985 | Loevinger |
| 4,844,336 | A | 7/1989 | Huber |
| 4,882,912 | A | 11/1989 | Fossey |
| 4,940,256 | A | 7/1990 | Jordan, III |
| 5,133,041 | A | 7/1992 | Richter |
| 5,183,371 | A | 2/1993 | O'Daniel |
| 5,402,857 | A | 4/1995 | Dietzen |
| 5,419,400 | A | 5/1995 | Wigington, Sr. |
| 5,564,509 | A | 10/1996 | Dietzen |
| 6,179,070 | B1 | 1/2001 | Dietzen |
| 6,179,071 | B1 | 1/2001 | Dietzen |
| 6,345,509 | B1 | 2/2002 | Garlov |
| 6,345,672 | B1 | 2/2002 | Dietzen |
| 6,347,589 | B1 | 2/2002 | Loevinger |
| 7,172,378 | B1 | 2/2007 | Cerullo |
| 8,109,327 | B2 | 2/2012 | Sulc |
| 8,328,290 | B2 | 12/2012 | Malatesta |
| 8,485,132 | B2 | 7/2013 | Kong |
| 9,061,623 | B2* | 6/2015 | MacLean .............. B60P 3/2235 |
| 9,233,792 | B2 | 1/2016 | Kooi |
| 9,358,987 | B2 | 6/2016 | Thomas |
| 9,386,845 | B2 | 7/2016 | Wu |
| 9,482,460 | B2 | 11/2016 | Laudet |
| 9,821,953 | B2 | 11/2017 | Sewell |
| 10,221,602 | B2 | 3/2019 | Sewell |
| 10,556,601 | B2 | 2/2020 | Hoffman |
| 10,647,239 | B2 | 5/2020 | Roberts |
| 10,683,679 | B2 | 6/2020 | Niemczewski |
| 10,933,794 | B1 | 3/2021 | Peterkin |
| 11,396,419 | B1 | 7/2022 | Peterkin |
| 11,618,367 | B2 | 4/2023 | Peterkin |
| 2002/0195019 | A1 | 12/2002 | Woodall |
| 2005/0104403 | A1* | 5/2005 | Brown ...................... B60P 1/26 296/50 |
| 2005/0284948 | A1 | 12/2005 | Robinson |
| 2007/0000545 | A1* | 1/2007 | Cannon ................... B60P 3/226 137/560 |
| 2007/0012680 | A1 | 1/2007 | Grisoni |
| 2007/0084801 | A1 | 4/2007 | Norman |
| 2007/0119628 | A1 | 5/2007 | Reddoch |
| 2010/0224640 | A1 | 9/2010 | Nothof |
| 2011/0103901 | A1 | 5/2011 | Hetcher |
| 2011/0211818 | A1 | 9/2011 | Grady |
| 2012/0073675 | A1 | 3/2012 | Dupuis |
| 2012/0138630 | A1 | 6/2012 | Kinsey, III |
| 2014/0021114 | A1 | 1/2014 | Ottney |
| 2015/0143840 | A1 | 5/2015 | Ma |
| 2015/0274057 | A1 | 10/2015 | Hinde |
| 2016/0265291 | A1* | 9/2016 | Powell, Jr. .............. C02F 1/048 |
| 2016/0376095 | A1 | 12/2016 | Tanaka |
| 2017/0081930 | A1 | 3/2017 | McMillian |
| 2017/0297814 | A1 | 10/2017 | Goldstein |
| 2018/0086245 | A1 | 3/2018 | Heck |
| 2018/0104622 | A1 | 4/2018 | Dawson |
| 2019/0263578 | A1 | 8/2019 | Meydoun |
| 2019/0316819 | A1 | 10/2019 | Savenstrand |
| 2020/0002157 | A1 | 1/2020 | Eardley |
| 2021/0394663 | A1 | 12/2021 | Meyer |
| 2023/0043561 | A1 | 2/2023 | Peterkin |
| 2023/0173973 | A1 | 6/2023 | Peterkin |
| 2023/0192393 | A1 | 6/2023 | Peterkin |
| 2023/0242030 | A1 | 8/2023 | Peterkin |

FOREIGN PATENT DOCUMENTS

| | | |
|---|---|---|
| CN | 102660917 A | 9/2012 |
| CN | 106347885 A | 1/2017 |
| CN | 205855038 U | 1/2017 |
| CN | 110027825 A | 7/2019 |
| CN | 110040385 A | 7/2019 |
| CN | 210504155 U | 5/2020 |
| CN | 112523035 A | 3/2021 |
| CN | 213541602 U | 6/2021 |
| CN | 114278797 A | 4/2022 |
| CN | 114644316 A | 6/2022 |
| EP | 381272 | 8/1990 |
| FR | 2739362 A1 | 4/1997 |
| GB | 489120 A | 7/1938 |
| GB | 627318 A | 8/1949 |
| GB | 2067522 A | 7/1981 |
| WO | 9113817 A | 9/1991 |
| WO | 0136296 A1 | 5/2001 |
| WO | 2013141707 A2 | 9/2013 |
| WO | 2013187997 A1 | 12/2013 |
| WO | 2014137230 A2 | 9/2014 |
| WO | 2015069564 A1 | 5/2015 |

OTHER PUBLICATIONS

Https://dragonproductsltd.com/roll-off-equipment-2/vacuum-box/; Dragon Products, LTD Vacuum Box Webpage; Received Aug. 2, 2021.

Https://toico.com/heated-collar/; Toico Industries; Heated Collar (Year: 2022).

Https://toico.com/heated-brass-lever-valve/; Toico Industries; Heated Brass Lever Valve (Year: 2022).

Https://dragonproductsltd.com/wp-content/uploads/bsk-pdf-manager/Vacuum_Box_177.pdf; Dragon Products, LTD Vacuum Box Brochure; Jul. 2017.

Http://www.glossary.oilfield.slb.com/en/Terms/s/skid/aspx; Schlumberger Oilfield Glossary entry for "skid" as it appeared in 2013.

* cited by examiner

TRANSPORTABLE SELF-CONTAINED CUTTING BOX

CROSS REFERENCE TO RELATED APPLICATIONS

This application claims the priority as a continuation of U.S. Nonprovisional Patent application Ser. No. 17/396,403 filed Aug. 6, 2021. Each of the aforementioned patent applications, and any applications related thereto, are herein incorporated by reference in their entirety.

FIELD OF TECHNOLOGY

This disclosure relates generally to technology for roll-off self-contained cutting boxes for heated slurry transport, receiving, and dumping in cold climates with freezing temperatures.

BACKGROUND

Drill cuttings are produced during drilling of oil wells and gas wells. The drill cuttings are carried to the surface by a drilling fluid circulating up from the drill bit. The drill cuttings are separated from the drilling fluid so the recycled drilling fluid may be reused during the drilling process. The separated drill cuttings along with a portion of the drilling fluid and other liquids form a cuttings slurry that is often transported to a vacuum tank for holding until is full. Once the tank is full of the cuttings slurry, the cuttings slurry is transportation to a disposal site.

One problem with conventional transporting drill cuttings in a vacuum tank is that the cuttings slurry may freeze in cold weather environments such as Alaska and Canada making it difficult to unload the cuttings slurry from the vacuum box. To solve this problem one solution is to provide for heat energy to keep the drill cuttings from freezing. One example of a heat solution is illustrated in U.S. Pat. No. 10,933,794 to Peterkin titled "Heated slurry transport system."

Vacuum tanks must be removed from oil and gas well sites in a timely manner such to not impede the function of the oil or gas well site. Such sites are limited in space and storing many vacuum tanks on the oil or gas well site is not possible with current vacuum tank systems. Further portable vacuum tanks which are too large do not fit the requirements to be efficiently emptied at disposal sites.

In the warm summer months, poor road conditions cause excess wear on equipment. Transporting vacuum tanks with heating functions over summer roads during times of the year when the heating functions are unneeded unnecessarily causes wear on such equipment.

SUMMARY

This disclosure is directed toward a self-contained heated portable vacuum slurry box which is configured for efficient transportation. The slurry box is such that it can be placed on a vehicle for transportation or moved at a particular location. An example of a vehicle that can be used with the slurry box is a traditionally understood roll-off truck.

With this invention, the portable tank can be loaded or unloaded from a roll-off truck. The tank is such that it can hold vacuum when a vacuum pump is fluidly attached to the tank. The vacuum can cause material such as drilling cuttings to be pulled into the portable tank.

The slurry box comprises a vacuum tank, a structure attached to the tank, a mechanical bay, a vertical tailgate, and a hook for pulling the slurry box onto a vehicle. The vertical tailgate allows for the slurry box to be unloaded in a compact space which does not allow for a traditional swing door that takes additional lateral room. Multiple slurry boxes may be stacked to conserve room on a well site. To adapt the slurry box for stacking, a stacking mount system and a stacking leg system is attached to the structure.

In summer months, the heating function of the slurry box is not needed. In summer months, roads which were frozen during winter months have thawed and become rough, therefore causing additional wear and tear on equipment being transported thereon. To reduce the amount of wear and tear on the slurry box power unit located in the mechanical bay, the power unit is adapted with quick disconnect connectors and quick disconnect fittings to allow for removal from the mechanical bay during summer months.

In winter months, jacketed openings are used on the slurry box to ensure material contained in the tank does not freeze at openings exposed to cold air during transportation. A thermo relief valve is mounted on the tank to ensure the tank does not become positively pressurized, due to warm material in the interior of the tank heating air, to cause expansion and therefore increased air pressure in the enclosed space of the tank.

BRIEF DESCRIPTION OF THE DRAWINGS

These and other features and advantages of the present invention will become more readily appreciated as the same becomes better understood by reference to the following detailed description when considered in connection with accompanying drawings, wherein.

DETAILED DESCRIPTION OF THE ILLUSTRATED EMBODIMENTS

General

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

Figures Detail

Figure 1:
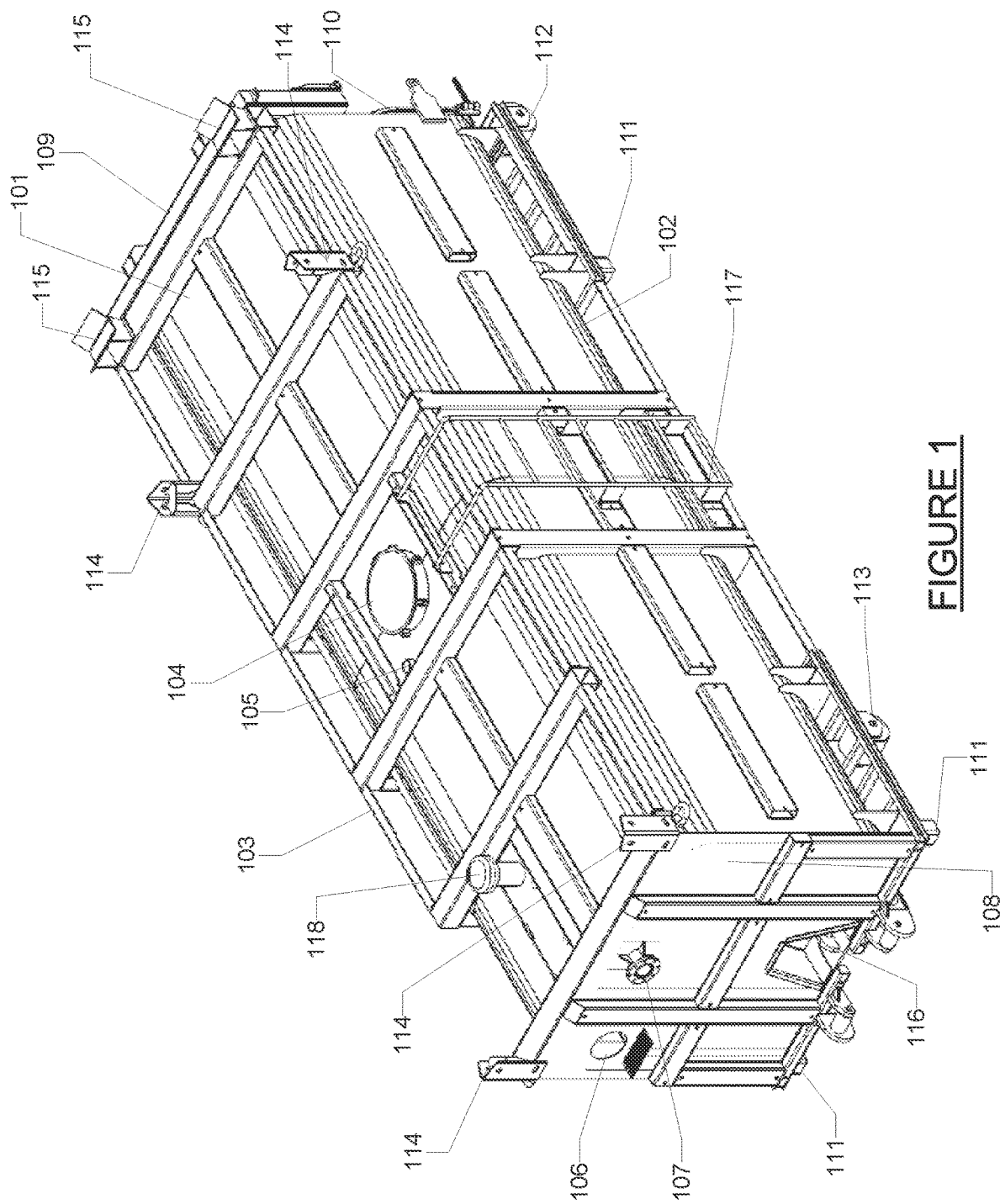
FIG. 1 is a 3D perspective of an exemplary slurry box.

FIG. 1 is a 3D perspective of an exemplary slurry box 101. The slurry box 101 is comprised of a tank 102, a structure 103, and a mechanical bay 106. The slurry box 101 has a front 108 and a rear 109. The tank 102 is attached to the structure 103. Attached to the tank 102 is a manhole 104 which can be opened to allow for a person to enter the tank 102 or to load or unload the tank 102. The tank 102 is such that it can withstand full or partial vacuum pressure. When the tank 102 is placed under a vacuum from an external vacuum pump, material may be drawn into the tank 102. Mounted on the tank 102 is a thermo relief valve 105. Fluidly attached to the tank 102 may be one or more openings for loading and unloading. Each opening may be closed to fluidly seal the tank 102. In this exemplary tank 102, a front pipe flange 107 is shown.

The front pipe flange 107 can be used either for loading or unloading depending on requirements dictated by the worksite at which the slurry box 101 is located. A vacuum pump may be fluidly attached to the front pipe flange 107 or any other pipe flange on the slurry box 101. The extent of the vacuum to be applied within the tank 102 may range all the way from relative atmospheric pressure to a full vacuum depending on the application at a worksite. In the event the front pipe flange 107 is not being utilized at a job site, the front pipe flange 107 may be covered or may be connected to a valve which seals the opening. Any opening on the tank 102, including the front pipe flange 107, may be jacketed with an exterior surface to allow a heat fluid flow to be circulated around an inner surface. For example, the front pipe flange 107 may have a five inch inner surface which material may be loaded or unloaded to the tank 102 and a six inch exterior surface.

At the rear of the slurry box 101 a tailgate 110 can be attached. FIG. 1 is displayed without a tailgate 110 attached. The tailgate 110 is attached to hinges on the slurry box 101 which allow for the tailgate 110 to be mechanically opened vertically. By attaching the tailgate 110 on the slurry box 101 such that it is vertically opened ensures that the slurry box 101 does not need additional lateral space to either side. In many applications the slurry box 101 needs to be unloaded at sites which do not allow for excess lateral space around the slurry box 101. When closed the tailgate 110 is sealed to the tank 102 such that the tank 102 may maintain vacuum pressure.

The structure 103 of the slurry box 101 is attached to the tank 102. A ladder may be attached to the slurry box 101 to allow for access to the manhole 104 at the top of the slurry box 101. The structure 103 allows for the slurry box 101 to be lifted, moved, or transported. At the bottom of the slurry box 101 a rear wheel set 112 is attached to the structure 103 near the rear 109. The rear wheel set 112 is as commonly appreciated for use in roll-off containers. In the exemplary embodiment shown in FIG. 1 an optional front wheel set 113 is shown. The rear wheel set 112 and the optional front wheel set 113 as included in some embodiments comprise a base wheel set.

The slurry box 101 may be stacked vertically when more than one slurry box 101 is used. Many gas or oil well sites have limited space on which equipment can be placed and the ability to stack the slurry box 101 is a valuable function. To enable the stacking function, attached to the structure 103 is at least one stacking leg 111 and at least one stacking mount 114. In the exemplary embodiment shown in FIG. 1 four stacking mounts and four stacking legs are demonstrated. A wheel platform 115 may be attached to the structure 103 to support a wheel set when a slurry box 101 is stacked. In the embodiment shown, a set of rear wheel platforms are demonstrated in a position that would support the rear wheel set 112 when stacked. The slurry box 101 may be lifted using d-rings and chains, a forklift, or any other lifting mechanism. When stacked each respective stacking leg 111 fits into each respective stacking mount 114. The one or more stacking mounts collectively comprise a stacking mount system. The one or more stacking legs comprise a stacking leg system. The stacking leg systems fits together with the stacking mount system.

In the embodiment shown in FIG. 1 the slurry box 101 is shown to be similar to a roll-off container. A roll-off container is a portable container which may be transported on a vehicle. In the figure, the slurry box 101 is shown similar to a cable type roll-off container. A cable roll-off container may be pulled or placed on a vehicle such as a tilt-bed vehicle such as a truck or trailer by a winch. A cable attached to the winch may be attached to a hook point 116 on the structure 103. The slurry box 101 may be then pulled onto the vehicle. In an alternative embodiment the structure 103 may be built to allow for the hook point 116 to be attached near the top of the structure 103 to allow for a hook-loader type vehicle to pull the slurry box 101 onto the vehicle. For the purpose of this disclosure, a roll-off vehicle is considered to be either a tilt-bed vehicle, a truck trailer combination, or a hook-loader type vehicle. A truck trailer combination type vehicle is a vehicle 201 where a truck pulls a trailer, the trailer which is a hook-loader type trailer or a tilt-bed type trailer. In a truck trailer combination the slurry box 101 is pulled onto the trailer section of the truck trailer combination just as a slurry box 101 is pulled onto a tilt-bed vehicle or a hook-loader type vehicle.

The slurry box 101 is sized to fit onto a vehicle. The slurry box 101 may be built in a variety of sizes and shapes to accommodate for different vehicles. An exemplary slurry box 101 may be 2.26 meters (89 inches) wide by 7.37 meters (290 inches) long. A slurry box 101 with such dimensions would be compliant with certain various jurisdictional transportation requirements.

A mechanical bay 106 is located within the slurry box 101. In the mechanical bay 106 certain ancillary equipment is located. A power unit 801 for providing heat energy to fluid within warming tubes and jacketed openings is located in the mechanical bay 106.

The power unit may also provide energy to power a hydraulic pump to produce flow and pressure to operate various hydraulic functions. Such hydraulic functions include but are not limited to hydraulically opening the tailgate 110. The power unit 801 may be a diesel engine with a fuel tank, an electric motor with a battery bank, or any other method as appreciated by one with ordinary skill in the art. The mechanical bay 106 is designed to allow for the power unit 801 to be disconnected and removed when not needed. An exhaust port 118 is positioned to allow for gas and air to circulate out of the mechanical bay 106.

The power unit is adapted to provide heat energy to fluid within warming tubes and jacketed openings. The warming tubes and jacketed openings contain a heating fluid which is provided heat from the power unit by the use of a heat exchanger or other method understood by a person with ordinary skill in the art. The fluid within is circulated through the warming tubes and jacketed openings for the purpose of distributing the heat energy. The fluid being circulated is a heated fluid flow.

The thermo relief valve 105 is such that if the pressure within the tank 102 increases, the pressure can be safely emitted from the tank. The thermo relief valve 105 ensures that the tank 102 does not become under a positive pressure.

The slurry box 101 may be constructed of rigid materials, such as steel or aluminum. The structure 103 materials must be of requisite strength to allow for the slurry box 101 to be lifted, transported, and the tank 102 filled with materials. The tank 102 must be constructed in materials capable of withstanding negative pressure up to a full vacuum.

Figure 2:
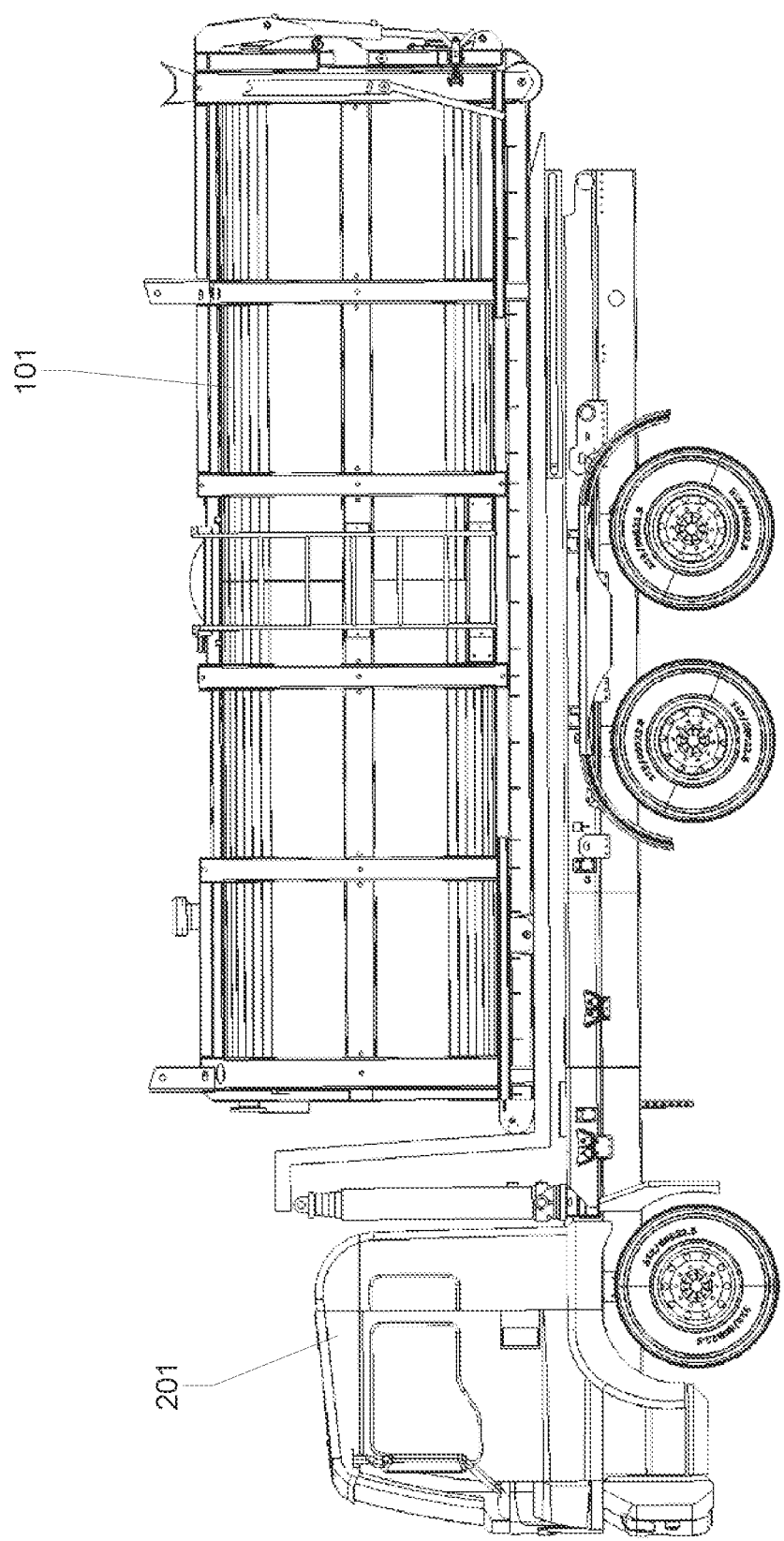
FIG. 2 is a 3D perspective of an exemplary slurry box mounted on a vehicle.

FIG. 2 is a 3D perspective of an exemplary slurry box 101 mounted on a vehicle 201. The vehicle 201 in this exemplary figure is a tilt-bed roll-off type vehicle. The exemplary slurry box 101 is shown as a cable type roll-off embodiment. Other types of vehicles and roll-off embodiments may be used as commonly appreciated by a person of ordinary skill in the art. The vehicle 201 configured as a tilt-bed roll-off type vehicle is capable of pulling the slurry box 101 onto the vehicle 201 and capable of causing the slurry box 101 to be displaced from the vehicle 201. The vehicle may cause a slurry box 101 to be displaced from the vehicle 201 and then pull a different slurry box 101 onto the vehicle 201. A well site may have multiple slurry boxes placed on site.

Figure 3:
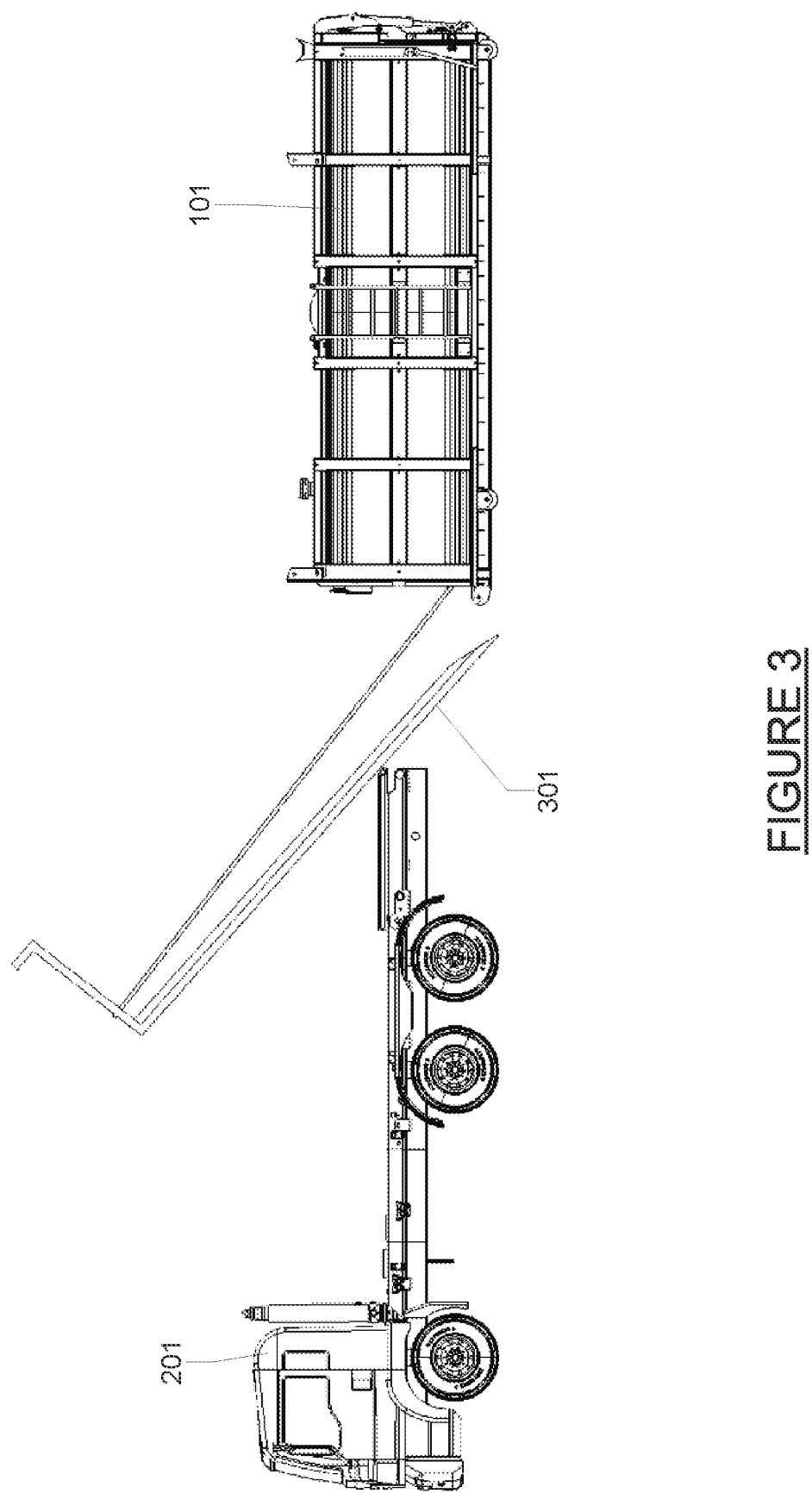
FIG. 3 is a 3D perspective of an exemplary slurry box displaced from a vehicle.

FIG. 3 is a 3D perspective of an exemplary slurry box 101 displaced from a vehicle 201. The vehicle 201 in the exemplary figure shows a tilt-bed roll-off type vehicle. The vehicle 201 is shown with a tilt-bed 301 and a cable 302. The cable 302 can be used to pull the slurry box 101 onto the tilt-bed 301.

Figure 4:
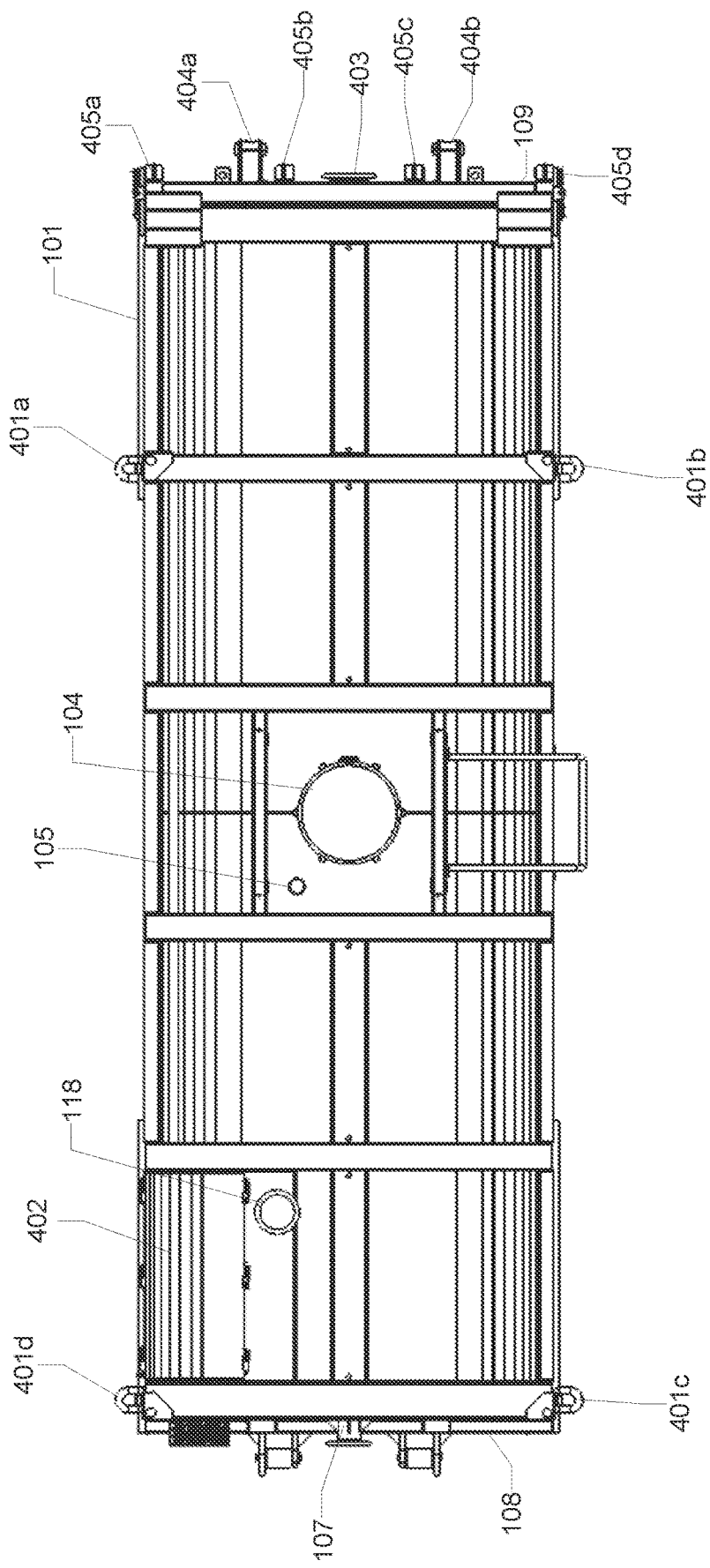
FIG. 4 is a 2D view of the top of an exemplary slurry box.

FIG. 4 is a 2D view of the top of an exemplary slurry box 101. Shown on the top of the slurry box 101 is the manhole 104, the thermo relief valve 105, the exhaust port 118, as well as other slurry box 101 features. In this exemplary figure, a set of lift hooks 401 are shown attached to the structure 103. The lift hooks 401 are positioned to allow for the slurry box 101 to be picked up. Near the front 108 of the slurry box 101 the mechanical bay 106 is shown. Access to the mechanical bay 106 can be had via a bay cover 402. At the front 108 of the slurry box 101 a front pipe flange 107 can be seen. At the rear 109 of the slurry box 101 a rear pipe flange 403 can be seen. Like the front pipe flange 107, the rear pipe flange 403 may be jacketed to allow for a heated fluid flow to be circulated around the inner surface such to keep the material within the tank 102 and within the jacketed flange from freezing.

At the rear 109 of the slurry box 101 a hydraulic mount 404a is shown. An additional hydraulic mount 404b is shown. Each hydraulic mount 404 is where a hydraulic cylinder may be connected. The hydraulic cylinder may be connected on the opposite end to the tailgate 110. When hydraulic pressure is delivered to the hydraulic cylinder, the tailgate 110 may be opened or closed by the retracting or extending of the hydraulic cylinder. The tailgate 110 is attached to the slurry box 101 with at least one tailgate hinge 405. In the exemplary FIG. 4 four hinges are shown.

Figure 5:
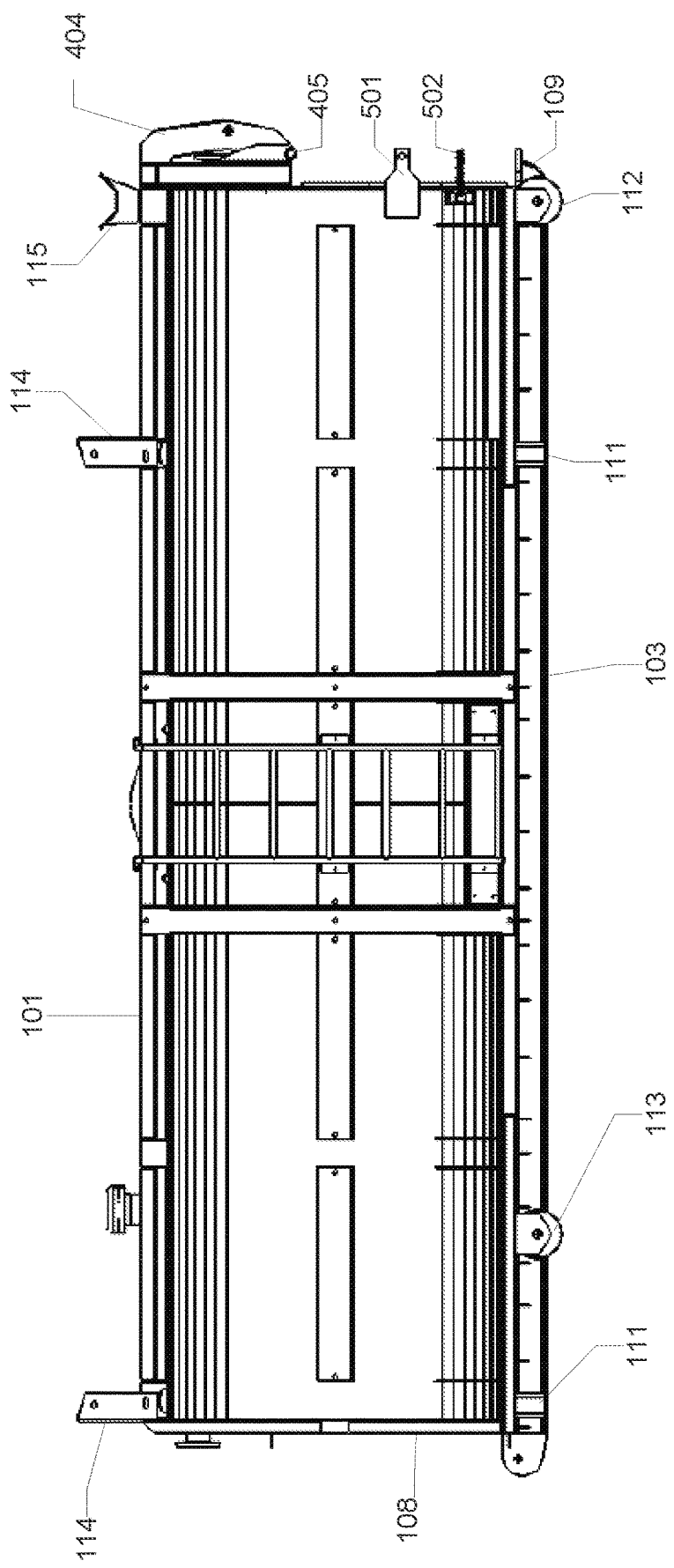
FIG. 5 is a 2D view of the driver-side perspective of an exemplary slurry box.

FIG. 5 is a 2D view of the driver-side perspective of an exemplary slurry box 101.

Shown attached to the structure 103 is the front wheel set 113 and a rear wheel set 112. A stacking leg 111 is attached near the front 108 of the slurry box 101 and near the rear 109. A stacking mount 114 is attached near the front 108 of the slurry box 101 and near the rear 109. A rear wheel platform 115 is shown near the rear 109 of the slurry box 101.

At the rear 109 of the slurry box 101, a hydraulic mount 404 is shown. In FIG. 5 the tailgate 110 and hydraulic cylinders are removed from the drawing. At least one tailgate hinge 405 is shown. A latch receiver 501 is attached to the tank 102. The latch receiver 501 interfaces with the tailgate 110 such that when the tailgate 110 is in the closed position, a hydraulic latch mounted on the tailgate 110 secures into the latch receiver 501. When the hydraulic latch is secured into the latch receiver 501, the tailgate 110 may not be moved from the closed position. The closed position is when the tailgate 110 is secured to the tank 102 and a fluid seal is made between the tank 102 and the tailgate 110. A manual latch 502 is attached to the tank 102. The manual latch 502 in this exemplary embodiment comprises a threaded bolt and a wingnut secured on the threaded bolt when the tailgate 110 is in the closed position. The wingnut in the example, is to be removed by an operator.

Figure 6:
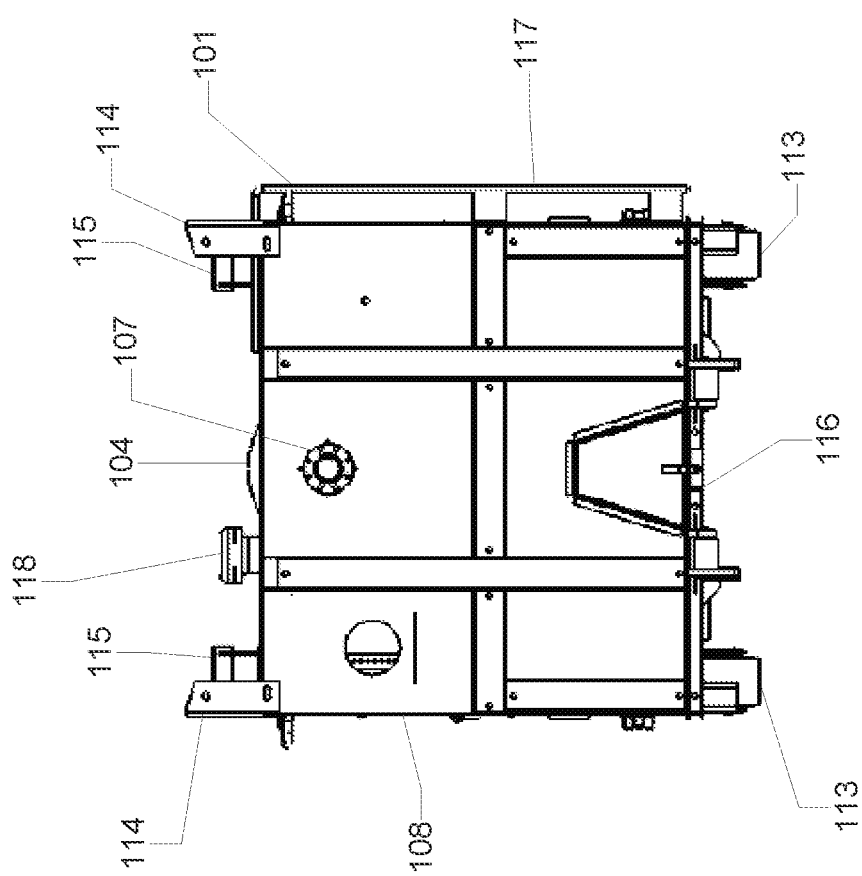
FIG. 6 is a 2D view of the front of an exemplary slurry box.

FIG. 6 is a 2D view of the front 108 of an exemplary slurry box 101. Shown in the figure is the front pipe flange 107 near the top of the slurry box 101. Mounted near the top of the slurry box 101 is at least one stacking mount 114. In the figure, two stacking mounts are displayed. At the bottom of the slurry box 101 at least one front wheel set 113 is shown. In the exemplary figure, two wheels are shown. A hook point 116 is shown in the figure. Shown in the figure is a partial view of a set of rear wheel platforms, a partial view of the manhole 104, and the exhaust port 118. On the side of the slurry box 101 can be seen a side profile of the ladder 117.

Figure 7:
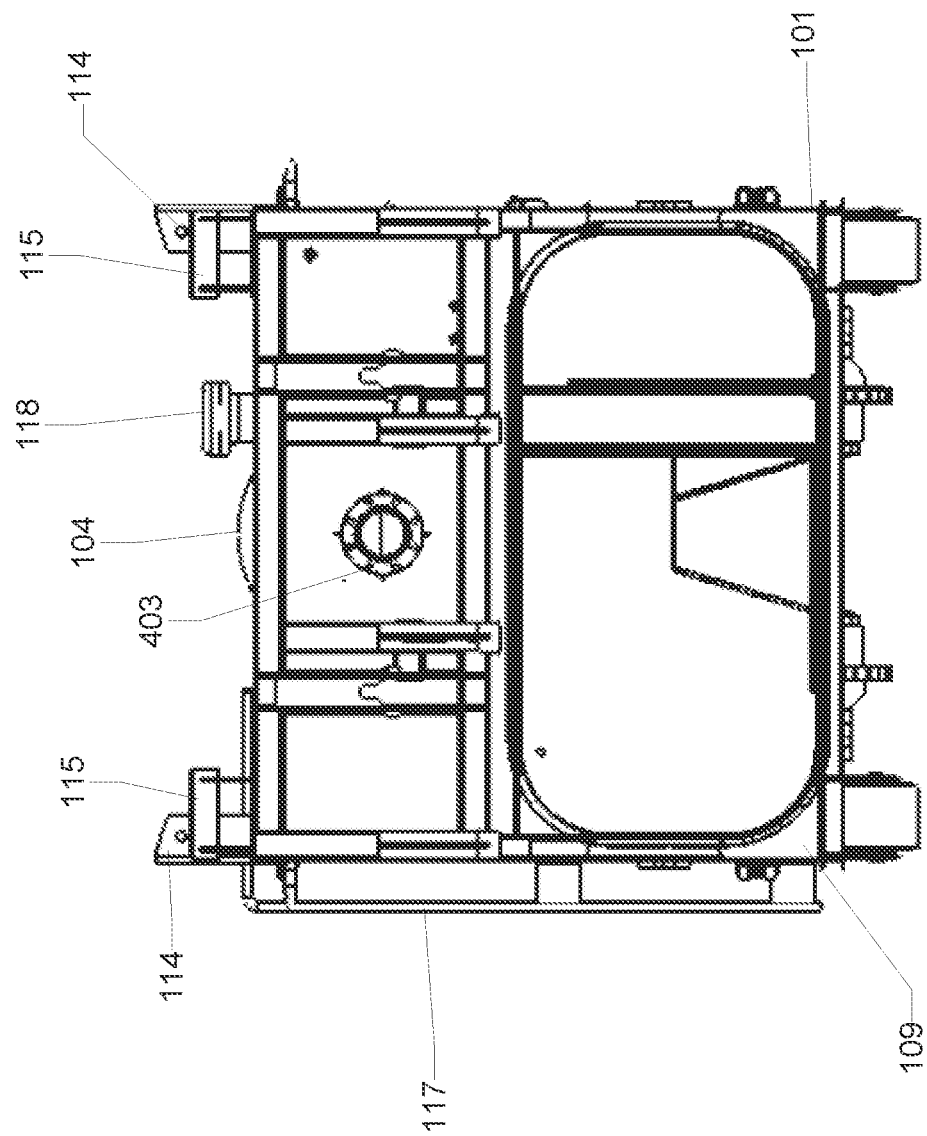
FIG. 7 is a 2D view of the rear of an exemplary slurry box.

FIG. 7 is a 2D view of the rear 109 of an exemplary slurry box 101. Attached to the slurry box 101 is at least one rear wheel platform 115. Shown in the figure is two rear wheel platforms. Alternatively, the slurry box 101 may be configured without any rear wheel platforms. At least one stacking mount 114 is attached to the slurry box 101. In the figure two stacking mounts are displayed. On the side of the slurry box 101 can be seen a side profile of the ladder 117. The manhole 104 and the exhaust port 118 may be located at the top of the slurry box. The manhole 104, the ladder 117, and the exhaust port 118 are not essential in all embodiments of the invention disclosed in this description. An optional rear pipe flange 403 is shown.

Figure 8:
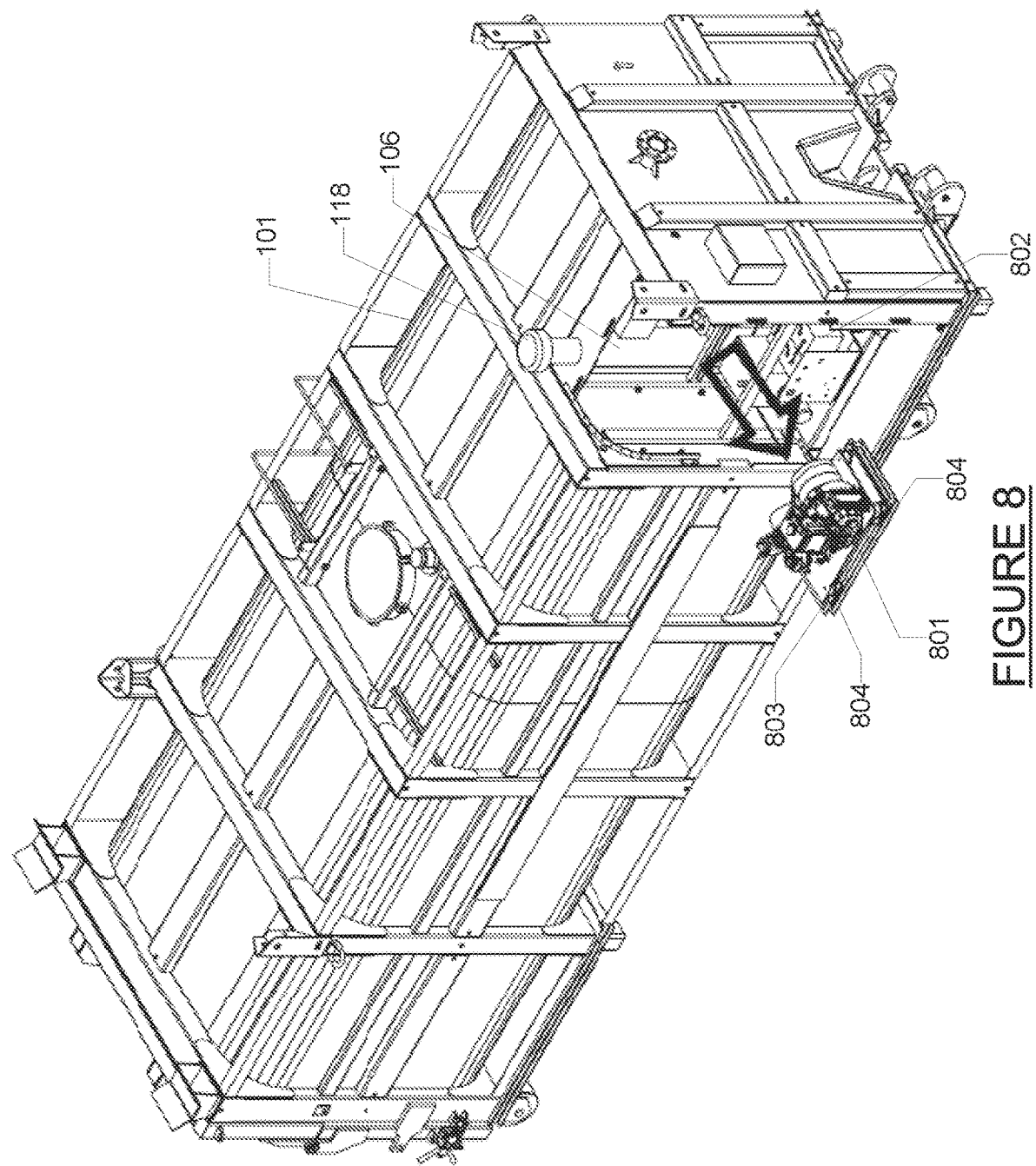
FIG. 8 is a 3D exemplary slurry box and shows how the power unit can be removed.

FIG. 8 is a 3D exemplary slurry box 101 and shows how the power unit 801 can be removed. The slurry box 101 is shown with a bay cover 402 opened such to allow access to the mechanical bay 106. The exhaust port 118 allows for exhaust to be vented from the mechanical bay 106. In the exemplary figure a diesel engine is shown as the power unit 801. The power unit 801 is connected to a hydraulic pump to produce hydraulic pressure, connected to a pump to provide a fluid flow through the warming tubes, and configured to provide heat energy to the fluid within the warming tubes. The diesel engine may be substituted with an alternative power unit device. Such alternatives include but are not limited to an electric motor, a gasoline engine, a turbine, or any other such device appreciated by one with ordinary skill in the art. The power unit 801 uses an energy source 802 attached to the slurry box 101. The energy source 802 may be electrical energy, chemical energy, gasoline, diesel, or other such energy source 802 which is compliant with the relevant power unit 801.

The power unit 801 may be configured on a skid 803 which allows for the power unit 801 to be removed from the mechanical bay 106. The skid 803 may be configured with one or more forklift pockets 804 to allow for the skid 803 and items to which it is attached to be removed from the mechanical bay 106 using a forklift. In alternative embodiments, the hydraulic pump and/or other components may be attached to the skid 803 to allow for removal from the mechanical bay 106. Any type of quick disconnect connectors understood by a person of ordinary skill in the art may be used to connect the skid 803 and items to which it is attached to warming tubes, hydraulic lines, electrical connections, and other elements on the slurry box 101.

Figure 9:
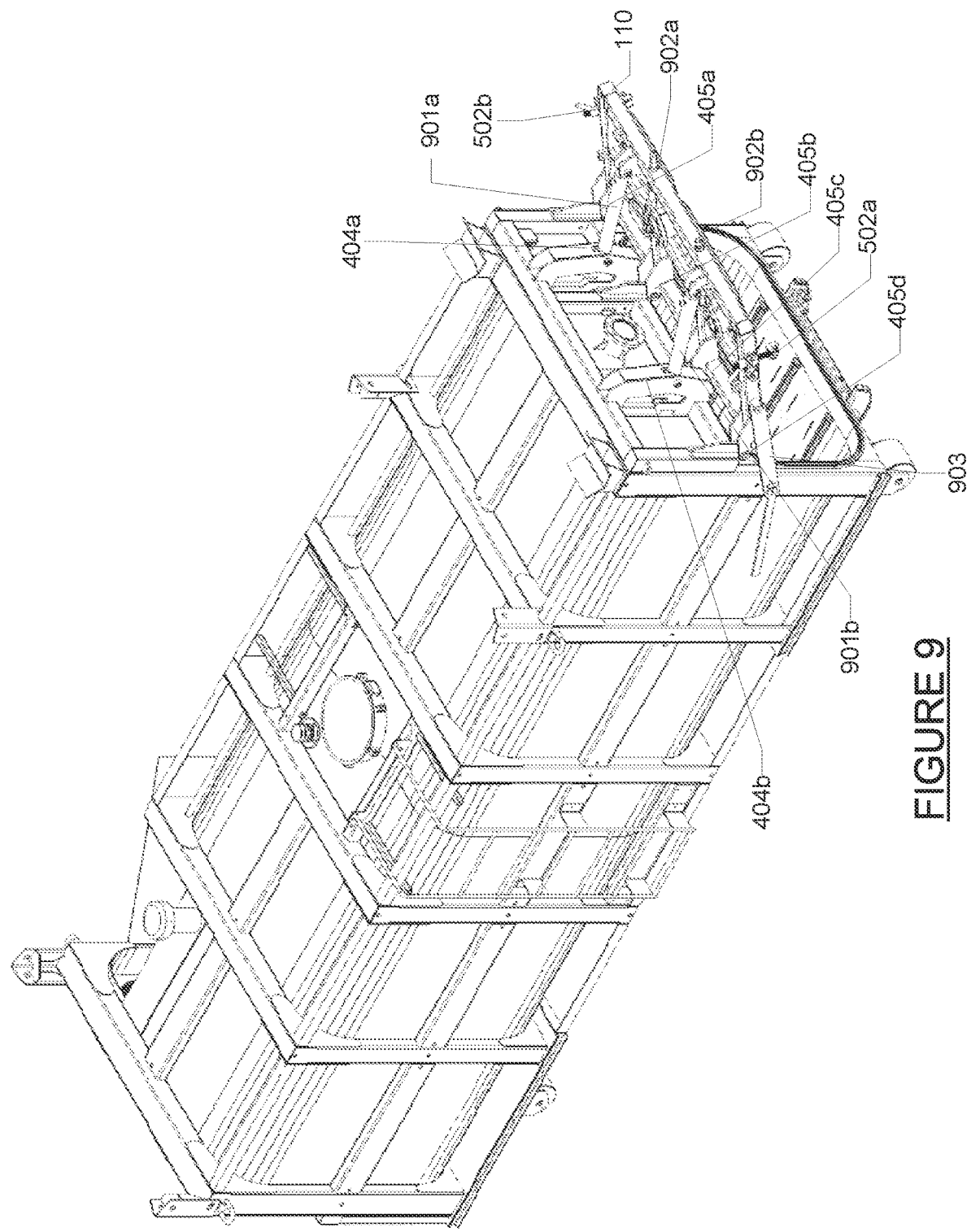
FIG. 9 is a 3D perspective of an exemplary slurry box showing the tailgate in the open position.

FIG. 9 is a 3D perspective of an exemplary slurry box 101 showing the tailgate 110 in the open position. The tailgate 110 may be opened using hydraulic force or any other force. In some embodiments at least one hydraulic cylinder 901 is used to open and close the tailgate 110. In the figure, two hydraulic cylinders are connected between the tailgate 110 and each hydraulic mount 404. The tailgate 110 is attached to the tank 102 by at least one tailgate hinge 405. The one or more hinges may be attached to the structure 103 or may be attached to the tank 102. The tailgate 110 closes such that it is attached to the tank 102 and fluidly seals the tank 102 when it is closed. In the exemplary embodiment a set of four hinges are shown which comprise the hinge 405.
The tailgate hinge 405 is configured such that its axis is parallel to the bottom of the structure 103. The tailgate 110 pivots on the tailgate hinge 405 such that it opens vertically.

When the tailgate 110 is moved to the closed position such that the tailgate 110 fluidly seals the tank 102, the tailgate is secured against the tank 102. The tailgate 110 can be secured against the tank 102 using a latch receiver 501, manual latch 502 as shown in FIG. 5, as shown in FIG. 9, or any other method appreciated by a person with ordinary skill in the art. In FIG. 9 an alternative type of manual latch 502 is shown. A vertical latch 902 may be used to secure the tailgate 110. The vertical latch 902 in this embodiment is functioned by a hydraulic force. A safety brace 903 may be attached to the structure 103 to ensure the tailgate 110 is forcefully maintained in an open position such that the tailgate 110 may not close due to the force of gravity or due to hydraulic force from a hydraulic cylinder 901. The safety brace 903 is hingedly attached to the structure 103 or tank 102 and is configured such that the tailgate 110 may not close when the safety brace 903 is positioned against the tailgate 110.

Figure 10:
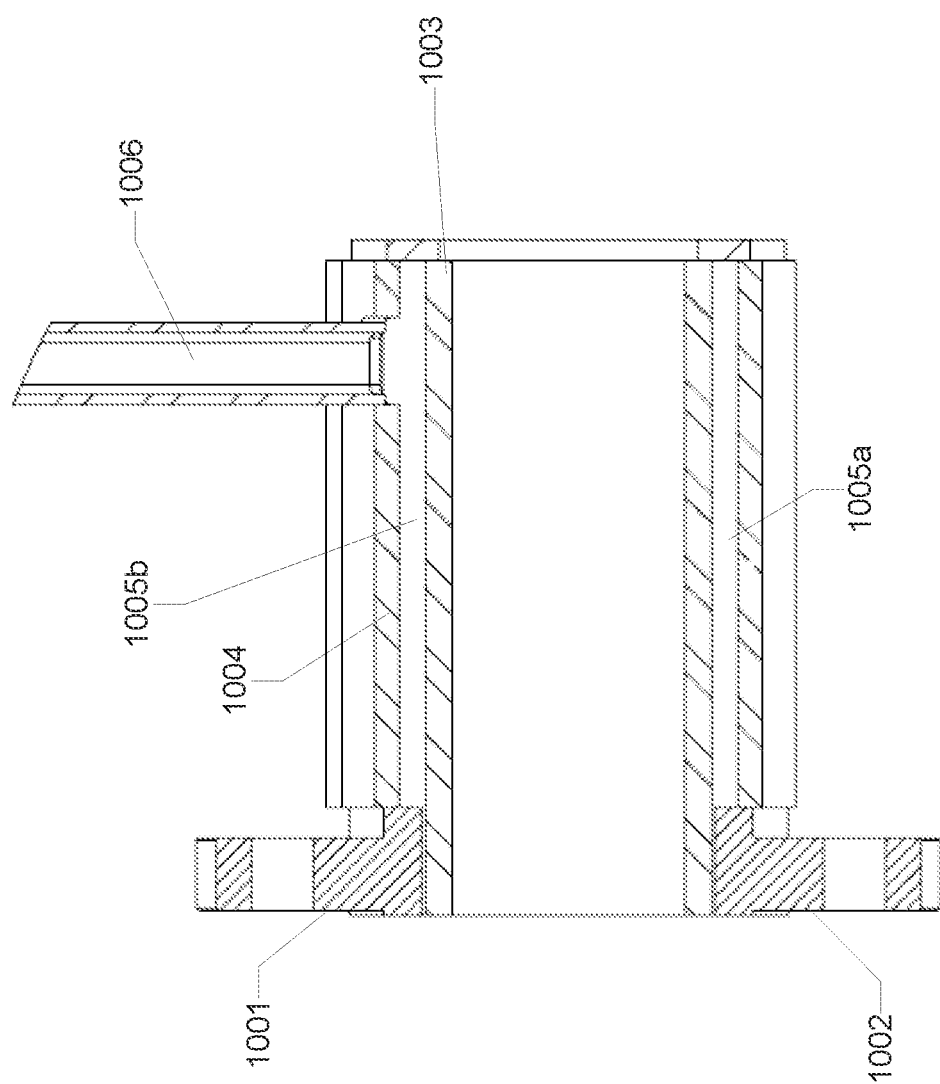
FIG. 10 is a 2D view of an exemplary jacketed flange.

FIG. 10 is a 2D view of an exemplary jacketed flange 1001. The exemplary jacketed flange 1001 may be the front pipe flange 107, a rear pipe flange 403, or any other opening in the tank 102. The jacket flange 1001 comprises of a flange face 1002, an inner surface 1003, an exterior surface 1004, and a warming channel 1005. Attached to the jacketed flange 1001 is a warming tube 1006. The warming tube 1006 conveys the heated fluid flow to the jacket flange 1001 warming channel 1005. The heated fluid flow is fluid which was heated by the power unit 801. The warming tube 1006 may be connected from any angle or location. The heated fluid flow which is conveyed to the warming channel 1005 maintains a temperature which causes any material located within the area contained by the inner surface 1003 to remain above a freeze temperature. The inner surface 1003 is essentially an opening which allows material to flow through. The exterior surface 1004 encloses the inner surface 1003.

Figure 11:
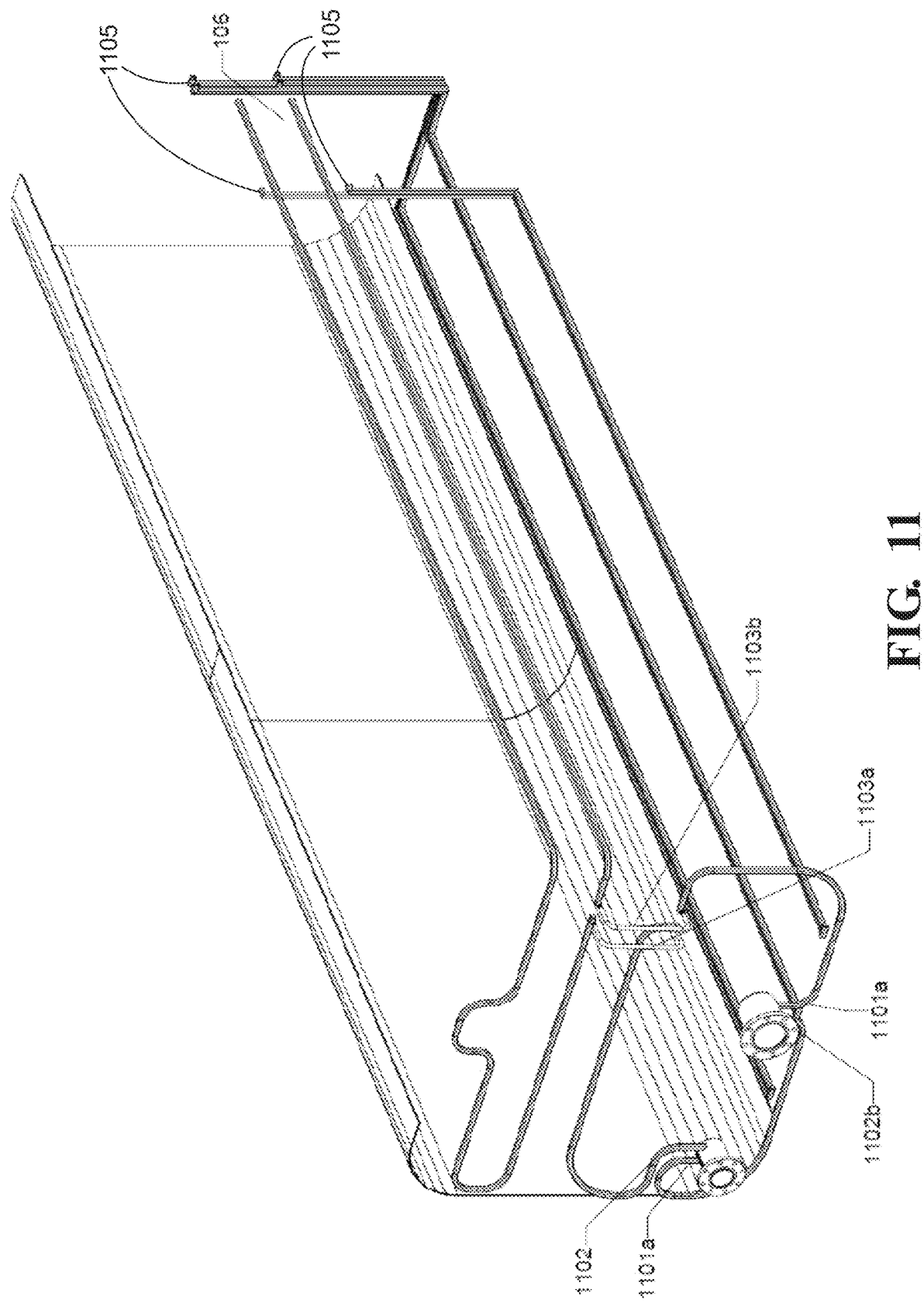
FIG. 11 is a 3D view of an exemplary set of warming tubes.

FIG. 11 is a 3D view of an exemplary set of warming tubes. The figure does not include all potential warming tubes which may be attached to the tank 102. Shown are two jacketed flanges which represent the location at which the tailgate 110 would be positioned when closed. The two shown flanges would be attached to the tailgate 110. A supply warming tube 1101 and an exit warming tube 1102 is attached to each of the jacketed flanges. Hinge warming tubes 1103 are used to connect warming tubes in the tailgate 110 to warming tubes attached to the tank 102. Warming tubes are configured to be positioned such to connect to connectors 1105 (illustrated schematically) in the mechanical bay 106.

Explanation of Exemplary Language

While various inventive aspects, concepts and features of the general inventive concepts are described and illustrated herein in the context of various exemplary embodiments, these various aspects, concepts and features may be used in many alternative embodiments, either individually or in various combinations and sub-combinations thereof.

Unless expressly excluded herein all such combinations and sub-combinations are intended to be within the scope of the general inventive concepts. Still further, while various alternative embodiments as to the various aspects, concepts and features of the inventions (such as alternative materials, structures, configurations, methods, devices and components, alternatives as to form, fit and function, and so on) may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the general inventive concepts even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A transportable slurry box for transporting a cuttings slurry in cold weather climates without the cuttings slurry freezing, the transportable slurry box, comprising:
   a tank having an interior to contain a cuttings slurry, wherein the tank is transportable by a vehicle;
   a door movable between a closed position and an open position to provide access to the interior; and
   a first heat loop attached to the interior of the tank to circulate a heated fluid flow to heat the cuttings slurry transported in the interior of the tank, wherein the first heat loop is attached to the interior of the tank;
   a heating unit, the first heat loop connectable to a supply port of the heating unit and the first heat loop connectable to a return port of the heating unit; and
   a mechanical bay that contains a power unit and the heating unit, the power unit to power the heating unit, the power unit and the heating unit removable from the transportable slurry box.

2. The transportable slurry box as recited in claim 1, wherein the door is at a rear end of the transportable slurry box.

3. The transportable slurry box as recited in claim 1, wherein the door is a tailgate.

4. The transportable slurry box as recited in claim 3, further comprising a tailgate hinge that is operable to attach the tailgate such that the tailgate is vertically movable between an open position and a closed position.

5. The transportable slurry box as recited in claim 1, further comprising a wheel set attached to the transportable slurry box to facilitate roll-on-roll-off operations from a vehicle.

6. The transportable slurry box as recited in claim 1, wherein the tank is a rectangular cuboid shaped structure.

7. A transportable slurry box for transporting a cuttings slurry in cold weather climates without the cuttings slurry freezing, the transportable slurry box, comprising:
   a tank having an interior to contain a cuttings slurry, wherein the tank is transportable by a vehicle;
   a door movable between a closed position and an open position to provide access to the interior;
   a heating unit attached to the power unit to heat the cuttings slurry above freezing, the heating unit comprises a supply port and a return port, and wherein the heating unit is adapted to heat a fluid producing a heated fluid flow; and
   a power unit to power the heating unit; and
   a first heat loop fluidly connected to the supply port of the heating unit and the return port of the heating unit, wherein the first heat loop comprises a first supply line fluidly connected to the supply port and a first return line fluidly connected to the return port, wherein the first heat loop is attached to the interior of the tank, and wherein the first heat loop circulates the heated fluid flow to heat the interior to heat the cuttings slurry transported in the tank in cold weather climates without the cuttings slurry freezing while transporting the tank.

8. The transportable slurry box as recited in claim 7, the first supply line and the first return line each have a straight structure that is parallel with respect to a longitudinal axis of the tank.

9. The transportable slurry box as recited in claim 7, further comprising a mechanical bay which contains the power unit and the heating unit.

10. The transportable slurry box as recited in claim 9, wherein the power unit is removable.

11. The transportable slurry box as recited in claim 9, wherein the heating unit is removable.

12. The transportable slurry box as recited in claim 7, wherein the door comprises a tailgate vertically movable between an open position and a closed position.

13. The transportable slurry box as recited in claim 12, further comprising a wheel set attached to the transportable slurry box to facilitate roll-on-roll-off operations from a vehicle.

14. The transportable slurry box as recited in claim 7, further comprising a mechanical bay which contains the power unit and a heating unit.

15. The transportable slurry box as recited in claim 14, wherein the power unit is removable.

16. The transportable slurry box as recited in claim 14, wherein the heating unit is removable.

17. The transportable slurry box as recited in claim 7, wherein the first heat loop comprises warming tubes connected to connectors in the mechanical bay, the connectors operable to connect with the heating unit.

18. The transportable slurry box as recited in claim 7, further comprising a hinge warming tube to connect warming tubes of the first heat loop in the tailgate to warming tubes of the first heat loop in the interior of the tank.

* * * * *